UNITED STATES PATENT OFFICE.

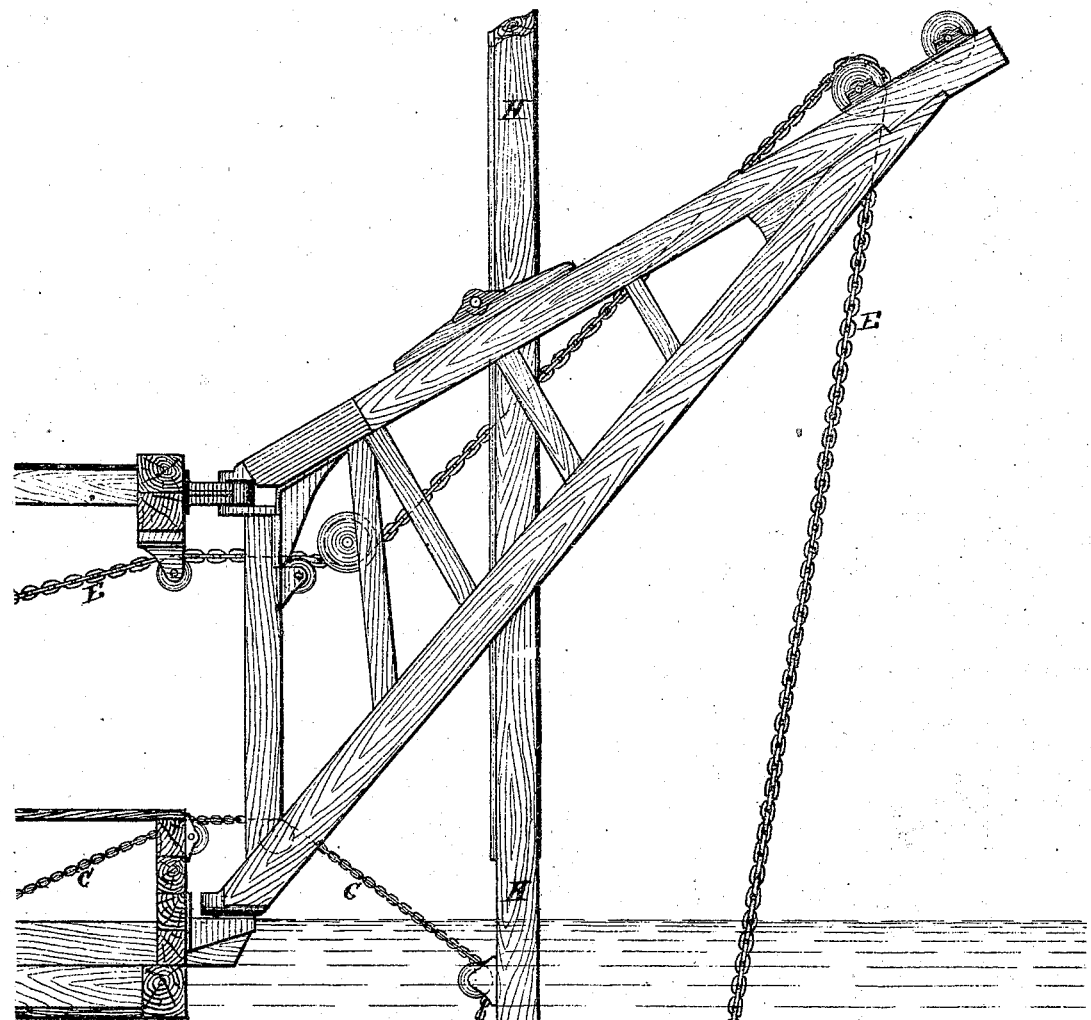

ROBERT R. OSGOOD AND RALPH R. OSGOOD, OF TROY, NEW YORK.

IMPROVEMENT IN SUBMARINE EXCAVATORS.

Specification forming part of Letters Patent No. 119,992, dated October 17, 1871.

*To all whom it may concern:*

Be it known that we, ROBERT R. OSGOOD, and RALPH R. OSGOOD, of Troy, in the county of Rensselaer and State of New York, have invented certain Improvements in Submarine-Picks; and we do hereby declare that the following is a full, clear, and exact description thereof, reference being had to the annexed drawing making a part of this specification, in which the figure represents the frame-work of a dredging-machine and the chains for operating the dipper or scoop-handle; and it also shows our improved pick applied to the lower end of such handle.

This invention relates to an improvement in picks for submarine dredging-machines; and it consists in combining, with the dipper or scoop-handle of such machines, a pick or cutter for the purpose of cutting or picking to pieces the earth in the bottoms of canals, rivers, ponds, and other places where excavations are to be made below the surface of water, as will be more fully explained hereinafter.

In applying our improvement to dredging-machines similar to the one shown, we place upon the lower end of the handle H which operates the scoop or dipper a metal socket, B, it being provided with flanges or shoulders upon its inner surfaces upon which the end of the handle bears, and with bolts and nuts for clamping it to said handle. The lower portion of this clamp consists of two projecting jaws, a sufficient space being left between them for the insertion of the pick or cutter K, which is to be substantially of the form shown, so that when it is pivoted to the socket B it may have the chains C and E attached to it for the purpose of giving it the proper movements. This pick or cutter may be made of steel and have the outer end of its short or cutting arm reduced to an edge or point suitable for cutting a groove in clay or other kinds of hard earth; or it may be made of wrought-iron and have its outer end shod with a steel point, as shown at M in the drawing.

In use this pick or cutter may be applied to the arm or handle which carries the scoop or shovel by removing the same and attaching the clamp B to the handle; or a separate handle may be provided for the pick, as preferred. When ready for use the handle or beam to which it is attached is allowed to drop down into the water until the pick or cutter reaches the earth, (the same being in the position shown in the drawing,) when the chain C is slackened and the machinery is put in operation, which draws the chain E upward and the cutting end of the pick is made to cut a groove or channel in the ground, the handle being fastened down to any suitable contrivance to prevent its rising while the cutting is being done. When the groove or channel has been cut, the chain E is slackened and the chain C is operated by its mechanism, and the cutter is returned to its original position, when, by turning the crane, or by moving the boat and operating the chain E, another groove or channel may be cut in any desired relation to the first one; and thus the earth, which was too hard to be operated upon by the scoop or dipper advantageously, will be loosened to such an extent that, when the scoop is again applied to it, it can be readily filled and the earth brought to the surface of the water and deposited in any suitable place.

What I claim as my invention, and desire to secure by Letters Patent, is—

Combining, with the handle or lever of a dredging-machine, or with a handle or lever to be substituted therefor, a cutter or pick for grooving or loosening the earth below the surface of the water, substantially as and for the purpose set forth.

In testimony whereof we have signed our names to this specification in the presence of two subscribing witnesses.

ROBT. R. OSGOOD.
RALPH R. OSGOOD.

Witnesses:
P. A. DEUEL,
A. H. SARBUCK.

(82)